United States Patent
Luomi et al.

(10) Patent No.: US 11,493,645 B2
(45) Date of Patent: Nov. 8, 2022

(54) METHOD AND APPARATUS FOR SELECTIVELY UTILIZING AN ONLINE POSITIONING SYSTEM TO DETERMINE A REFERENCE POSITION ASSOCIATED WITH FINGERPRINT DATA

(71) Applicant: HERE GLOBAL B.V., Eindhoven (NL)

(72) Inventors: Marko Luomi, Lempäälä (FI); Pavel Ivanov, Tampere (FI); Henri Jaakko Julius Nurminen, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 58 days.

(21) Appl. No.: 16/952,905

(22) Filed: Nov. 19, 2020

(65) Prior Publication Data

US 2022/0155464 A1  May 19, 2022

(51) Int. Cl.
 G01S 19/48 (2010.01)
 H04W 12/79 (2021.01)
 (Continued)

(52) U.S. Cl.
 CPC ............ G01S 19/48 (2013.01); G01S 19/396 (2019.08); G01S 19/40 (2013.01)

(58) Field of Classification Search
 CPC .............................. G01S 19/48; H04W 12/79
 (Continued)

(56) References Cited

U.S. PATENT DOCUMENTS 9,503,858 B2  11/2016 Palanki et al.
9,609,539 B2   3/2017 Edge et al.
(Continued)

FOREIGN PATENT DOCUMENTS

CN   109769201 A  *  5/2019
WO   WO-2019160083 A1  *  8/2019  ............ H04W 16/18

OTHER PUBLICATIONS

Jang, Beakcheol et al., *An Accurate Indoor Positioning Algorithm Using Sensors and Crowdsourced Landmarks*, IPSCL, Jun. 29, 2019, vol. 19(3) (30 pages).
(Continued)

*Primary Examiner* — Harry K Liu
(74) *Attorney, Agent, or Firm* — Alston & Bird LLP

(57) ABSTRACT

A method, apparatus and computer program product are provided to estimate the reference position associated with fingerprint data by selectively utilizing an online positioning system. In the context of a method and in an instance in which a global navigation satellite system is available for location determination, the method determines the location of a data collection device in conjunction with the collection of fingerprint data. In this instance, the location is determined based upon information provided by the global navigation satellite system. However, in an instance in which the global navigation satellite system is unavailable for location determination, the method provides, via a computer network, an online positioning system with at least some fingerprint data collected by the data collection device. In this instance, the method also determines the location of the data collection device in conjunction with the fingerprint data based upon information provided by the online positioning system.

19 Claims, 2 Drawing Sheets

(51) Int. Cl.
*G01S 19/39* (2010.01)
*G01S 19/40* (2010.01)

(58) Field of Classification Search
USPC .......................................... 342/352, 357.28
See application file for complete search history.

(56) References Cited

U.S. PATENT DOCUMENTS

| | | |
|---|---|---|
| 10,111,197 B2 | 10/2018 | Ronen |
| 2015/0133149 A1* | 5/2015 | Kim .................. H04W 64/00 455/456.1 |
| 2015/0334678 A1 | 11/2015 | MacGougan et al. |
| 2015/0350902 A1* | 12/2015 | Baxley ............... H04W 12/08 726/7 |
| 2016/0371394 A1 | 12/2016 | Shahidi et al. |
| 2018/0279067 A1 | 9/2018 | Ivanov et al. |
| 2019/0090096 A1* | 3/2019 | Ivanov .................. H04W 4/30 |

OTHER PUBLICATIONS

Jung, Suk-Hoon et al., Automated Construction and Maintenance of Wi-Fi Radio Maps for Crowdsourcing-Based Indoor Positioning Systems, IEEE *Access*, Dec. 6, 2017, vol. 6, 2018, pp. 1764-1777 (14 pages).
Patentability Search Report dated Jul. 21, 2020 (23 pages).
Extended European Search Report for European Application No. 21207920.6 dated Mar. 28, 2022, 8 pages.

* cited by examiner

METHOD AND APPARATUS FOR SELECTIVELY UTILIZING AN ONLINE POSITIONING SYSTEM TO DETERMINE A REFERENCE POSITION ASSOCIATED WITH FINGERPRINT DATA

TECHNOLOGICAL FIELD

An example embodiment relates generally to the determination of a reference position associated with fingerprint data that has been collected by a data collection device and, more particularly, to the selective utilization of an online positioning system to determine the reference position associated with the fingerprint data.

BACKGROUND

Crowd sourcing is a technique utilized to gather fingerprint data. The fingerprint data may, in turn, be utilized for various purposes including, for example, to develop a radio map or to compile other information that may thereafter be utilized in conjunction with positioning or navigation applications. The fingerprint data generally includes information identifying an access point that transmits the signals that are captured by a data collection device as well as one or more parameters or characteristics of the signals captured by the data collection device. For example, the access point may be identified by a Basic Service Set Identifier (BSSID) and the parameters or characteristics of the signals captured by the data collection device may include the received signal strength, the round trip time, the frequency band and/or the Service Set Identifier (SSID). The location of the data collection device at the time at which the signals were captured is also determined such that the fingerprint data has a corresponding reference position.

Various network positioning systems may be utilized in order to determine the reference position associated with the fingerprint data captured by a data collection device. For example, a Wi-Fi positioning system may be utilized to estimate the reference position of fingerprint data, particularly in instances in which the Global Navigation Satellite System (GNSS) is unavailable or inaccessible for reference position estimation, such as in an instance in which the data collection device is within a building or in an instance in which the data collection device does not have GNSS functionality. In these situations, a Wi-Fi positioning system or another network positioning system may be utilized to provide the reference position estimation in an offline manner, that is, without communication over a computer network with an online positioning system.

While offline network positioning systems provide for the estimation of a reference position in association with fingerprint data collected by a data collection device in an instance in which GNSS and/or another online positioning system are inaccessible or unavailable, the reliance upon an offline network positioning system imposes certain limitations. In this regard, the reliance upon an offline network positioning system, such as Wi-Fi positioning system, may require a data collection device to store a radio map or other information from which the position of the data collection device may be estimated. The storage of a radio map or other positioning information typically consumes a substantial quantity of memory and at least some data collection devices, such as a basic Internet of Things (IoT) device, may not have memory or at least not sufficient memory to store the radio map or other positioning information. Additionally, the radio map or other positioning information that is required to support the determination of a reference position for the fingerprint data is generally downloaded to the data collection device, thereby consuming a substantial quantity of bandwidth. This downloading of a radio map or other positioning information to support reference position estimation may not be possible or may be cost prohibitive in some instances due to the data plan under which the data collection device operates or due to network bandwidth limitations.

Further, the reliance upon a radio map or other positioning information that is stored locally by a data collection device in order to determine the reference position associated with the fingerprint data may impose a burden upon the maintenance and updating of the radio map or other related positioning information. In this regard, the radio map or other positioning information must generally be updated over time; a process that is complicated by the storage of the radio map or other positioning information by each of the plurality of data collection devices. As such, the reliance upon radio maps or other positioning information for reference position estimation in conjunction with fingerprint data imposes additional requirements and limitations upon the data collection devices that collect the fingerprint data, such as the data collection devices utilized by crowd source participants.

BRIEF SUMMARY

A method, apparatus and computer program product are provided in accordance with an example embodiment in order to utilize an online positioning system for reference position estimation, such as in conjunction with the determination of a reference position associated with fingerprint data collected by a data collection device including a data collection device, such as a data collection device utilized in conjunction with the crowd sourced collection of fingerprint data to support positioning or navigation applications. By relying upon an online positioning system for the reference position estimation in some instances, a radio map or related positioning information from which a reference position may be estimated need not be downloaded to and stored by a data collection device, thereby reducing the bandwidth consumption and memory requirements. Additionally, the radio map or other information that may be utilized for reference position estimation may be updated in a more efficient manner, such as by the online positioning system without further communication with the plurality of data collection devices.

In an example embodiment, a method is provided that includes determining, in an instance in which a global navigation satellite system is available for location determination, the location of a data collection device in conjunction with the collection of fingerprint data. In this instance, the location is determined based upon information provided by the global navigation satellite system. However, in an instance in which the global navigation satellite system is unavailable for location determination, the method provides, via a computer network, an online positioning system with at least some fingerprint data collected by the data collection device. In this instance, the method also determines the location of the data collection device in conjunction with the fingerprint data based upon information provided by the online positioning system.

The method of an example embodiment provides the online positioning system with at least some of the fingerprint data by providing the online positioning system with a batch of fingerprint data including fingerprint data associated with a plurality of data points. In this example embodiment, the method also includes receiving information from the online positioning system related to the location of the data collection device in conjunction with its collection of each of the plurality of data points.

The method of an example embodiment provides the online positioning system with a batch of fingerprint data by triggering provision of the batch of fingerprint data to the online positioning system based upon at least one of the establishment by the data collection device of a connection with one or more predefined types of access networks and/or a connection of the data collection device with an external power supply. Additionally or alternatively, the method of an example embodiment provides the online positioning system with a batch of fingerprint data by triggering provision of the batch of fingerprint data to the online positioning system based upon the collection of a predefined number of data points or at least a predefined quantity of data by the data collection device. Additionally or alternatively, the method of an example embodiment provides the online positioning system with a batch of fingerprint data by triggering provision of the batch of fingerprint data to the online positioning system based upon a predefined time interval. In an example embodiment, a method also includes determining motion of the data collection device. In this example embodiment, the method provides the online positioning system with the batch of fingerprint data by triggering provision of the batch of fingerprint data to the online positioning system in an instance in which the data collection device is determined to have become stationary after having been in motion.

The method of an example embodiment determines the location of the data collection device in conjunction with its collection of fingerprint data by determining the location associated with an intermediate data point of the fingerprint data based at least in part upon the respective locations determined for one or more data points collected prior to collection of the intermediate data point and also upon the respective locations determined for one or more data point collected following collection of the intermediate data point. In an example embodiment, the method determines the location of the data collection device by determining the location of the data collection device in conjunction with its collection of fingerprint data based upon information provided by the global navigation satellite system or the online positioning system in combination of information provided by one or more sensors associated with the data collection device. In this example embodiment, the method may also include determining that at least one of the sensors is unreliable and reducing reliance upon the information provided by the at least one sensor that is determined to be unreliable in conjunction with determining the location of the data collection device.

The online positioning system of an example embodiment includes a positioning system that is remote from the data collection device, is accessible via the computer network and utilizes predefined positioning coverage information to identify the location of the data collection device. In an example embodiment, the method determines the location of the data collection device in conjunction with its collection of fingerprint data by determining or enabling determination of a reference position associated with the fingerprint data that is collected based upon information provided by the online positioning system. In an example embodiment, the method also includes determining the location of the data collection device in conjunction with its collection of fingerprint data based upon information provided by the online positioning system in an instance in which the global navigation satellite system is available for location determination.

In another example embodiment, an apparatus is provided that includes processing circuitry and at least one memory including computer program code instructions with the computer program code instructions configured to, when executed by the processing circuitry, cause the apparatus to determine, in an instance in which a global navigation satellite system is available for location determination, the location of a data collection device in conjunction with the collection of fingerprint data. In this instance, the location is determined based upon information provided by the global navigation satellite system. However, in an instance in which the global navigation satellite system is unavailable for location determination, the computer program code instructions are configured to, when executed by the processing circuitry, cause the apparatus to provide, via a computer network, an online positioning system with at least some fingerprint data collected by the data collection device. In this instance, the computer program code instructions are also configured to, when executed by the processing circuitry, cause the apparatus to determine the location of the data collection device in conjunction with the fingerprint data based upon information provided by the online positioning system.

The computer program code instructions are configured to, when executed by the processing circuitry, cause the apparatus of an example embodiment to provide the online positioning system with at least some of the fingerprint data by providing the online positioning system with a batch of fingerprint data including fingerprint data associated with a plurality of data points. In this example embodiment, the computer program code instructions are also configured to, when executed by the processing circuitry, cause the apparatus to receive information from the online positioning system related to the location of the data collection device in conjunction with its collection of each of the plurality of data points.

The computer program code instructions are configured to, when executed by the processing circuitry, cause the apparatus of an example embodiment to provide the online positioning system with a batch of fingerprint data by triggering provision of the batch of fingerprint data to the online positioning system based upon at least one of the establishment by the data collection device of a connection with one or more predefined types of access networks and/or a connection of the data collection device with an external power supply. Additionally or alternatively, the computer program code instructions are configured to, when executed by the processing circuitry, cause the apparatus of an example embodiment to provide the online positioning system with a batch of fingerprint data by triggering provision of the batch of fingerprint data to the online positioning system based upon the collection of a predefined number of data points or at least a predefined quantity of data by the data collection device. Additionally or alternatively, the computer program code instructions are configured to, when executed by the processing circuitry, cause the apparatus of an example embodiment to provide the online positioning system with a batch of fingerprint data by triggering provision of the batch of fingerprint data to the online positioning system based upon a predefined time interval. In an example embodiment, the computer program code instructions are also configured to, when executed by the processing circuitry, cause the apparatus to determine motion of the data collection device. In this example embodiment, the computer program code instructions are also configured to, when executed by the processing circuity, cause the apparatus to provide the online positioning system with the batch of fingerprint data by triggering provision of the batch of fingerprint data to the online positioning system in an instance in which the data collection device is determined to have become stationary after having been in motion.

The computer program code instructions are configured to, when executed by the processing circuity, cause the apparatus of an example embodiment to determine the location of the data collection device in conjunction with its collection of fingerprint data by determining the location associated with an intermediate data point of the fingerprint data based at least in part upon the respective locations determined for one or more data points collected prior to collection of the intermediate data point and also upon the respective locations determined for one or more data point collected following collection of the intermediate data point. In an example embodiment, the computer program code instructions are configured to, when executed by the processing circuity, cause the apparatus to determine the location of the data collection device by determining the location of the data collection device in conjunction with its collection of fingerprint data based upon information provided by the global navigation satellite system or the online positioning system in combination of information provided by one or more sensors associated with the data collection device. In this example embodiment, the computer program code instructions may also be configured to, when executed by the processing circuity, cause the apparatus to include determining that at least one of the sensors is unreliable and reducing reliance upon the information provided by the at least one sensor that is determined to be unreliable in conjunction with determining the location of the data collection device.

The online positioning system of an example embodiment includes a positioning system that is remote from the data collection device, is accessible via the computer network and utilizes predefined positioning coverage information to identify the location of the data collection device. In an example embodiment, the computer program code instructions are configured to, when executed by the processing circuity, cause the apparatus to determine the location of the data collection device in conjunction with its collection of fingerprint data by determining or enabling determination of a reference position associated with the fingerprint data that is collected based upon information provided by the online positioning system. In an example embodiment, the computer program code instructions are configured to, when executed by the processing circuity, cause the apparatus to determine the location of the data collection device in conjunction with its collection of fingerprint data based upon information provided by the online positioning system in an instance in which the global navigation satellite system is available for location determination.

In a further example embodiment, a computer program product is provided that includes at least one non-transitory computer-readable storage medium having computer-executable program code portions stored therein with the computer-executable program code portions including program code instructions configured to determine, in an instance in which a global navigation satellite system is available for location determination, the location of a data collection device in conjunction with the collection of fingerprint data. In this instance, the location is determined based upon information provided by the global navigation satellite system. However, in an instance in which the global navigation satellite system is unavailable for location determination, the computer-executable program code portions include program code instructions configured to provide, via a computer network, an online positioning system with at least some fingerprint data collected by the data collection device. In this instance, the computer-executable program code portions also include program code instructions configured to determine the location of the data collection device in conjunction with the fingerprint data based upon information provided by the online positioning system.

The program code instructions of one embodiment that are configured to provide the online positioning system with at least some of the fingerprint data include program code instructions configured to provide the online positioning system with a batch of fingerprint data including fingerprint data associated with a plurality of data points. In this example embodiment, the computer-executable program code portions also include program code instructions configured to receive information from the online positioning system related to the location of the data collection device in conjunction with its collection of each of the plurality of data points.

The program code instructions configured to provide the online positioning system with a batch of fingerprint data include, in one embodiment, program code instructions configured to trigger provision of the batch of fingerprint data to the online positioning system based upon at least one of the establishment by the data collection device of a connection with one or more predefined types of access networks and/or a connection of the data collection device with an external power supply. The program code instructions configured to provide the online positioning system with a batch of fingerprint data include, in one additional or alternative embodiment, program code instructions configured to triggering provision of the batch of fingerprint data to the online positioning system based upon the collection of a predefined number of data points or at least a predefined quantity of data by the data collection device. Additionally or alternatively, the program code instructions configured to provide the online positioning system with a batch of fingerprint data include, in one embodiment, program code instructions configured to trigger provision of the batch of fingerprint data to the online positioning system based upon a predefined time interval. In an example embodiment, the computer-executable program code portions also include program code instructions configured to determine motion of the data collection device. In this example embodiment, the program code instructions configured to provide the online positioning system with a batch of fingerprint data include program code instructions configured to trigger provision of the batch of fingerprint data to the online positioning system in an instance in which the data collection device is determined to have become stationary after having been in motion.

The program code instructions of an example embodiment that are configured to determine the location of the data collection device in conjunction with its collection of fingerprint data include program code instructions configured to determining the location associated with an intermediate data point of the fingerprint data based at least in part upon the respective locations determined for one or more data points collected prior to collection of the intermediate data point and also upon the respective locations determined for one or more data point collected following collection of the intermediate data point. In an example embodiment, the program code instructions configured to determine the location of the data collection device include program code instructions configured to determine the location of the data collection device in conjunction with its collection of fingerprint data based upon information provided by the global navigation satellite system or the online positioning system in combination of information provided by one or more sensors associated with the data collection device. In this example embodiment, the computer-executable program code portions may also include program code instructions configured to determine that at least one of the sensors is unreliable and program code instructions configured to reduce reliance upon the information provided by the at least one sensor that is determined to be unreliable in conjunction with determining the location of the data collection device.

The online positioning system of an example embodiment includes a positioning system that is remote from the data collection device, is accessible via the computer network and utilizes predefined positioning coverage information to identify the location of the data collection device. In an example embodiment, the program code instructions configured to determine the location of the data collection device in conjunction with its collection of fingerprint data include program code instructions configured to determine or enable determination of a reference position associated with the fingerprint data that is collected based upon information provided by the online positioning system. The program code instructions of an example embodiment are also configured to determine the location of the data collection device in conjunction with its collection of fingerprint data based upon information provided by the online positioning system in an instance in which the global navigation satellite system is available for location determination.

In yet another example embodiment, an apparatus is provided that includes means for determining, in an instance in which a global navigation satellite system is available for location determination, the location of a data collection device in conjunction with the collection of fingerprint data. In this instance, the location is determined based upon information provided by the global navigation satellite system. However, in an instance in which the global navigation satellite system is unavailable for location determination, the apparatus includes means for providing, via a computer network, an online positioning system with at least some fingerprint data collected by the data collection device. In this instance, the apparatus also includes means for determining the location of the data collection device in conjunction with the fingerprint data based upon information provided by the online positioning system.

The means for providing the online positioning system with at least some of the fingerprint data includes, in an example embodiment, means for providing the online positioning system with a batch of fingerprint data including fingerprint data associated with a plurality of data points. In this example embodiment, the apparatus also includes means for receiving information from the online positioning system related to the location of the data collection device in conjunction with its collection of each of the plurality of data points.

The means for providing the online positioning system with a batch of fingerprint data includes, in one example embodiment, means for triggering provision of the batch of fingerprint data to the online positioning system based upon at least one of the establishment by the data collection device of a connection with one or more predefined types of access networks and/or a connection of the data collection device with an external power supply. Additionally or alternatively, the means for providing the online positioning system with a batch of fingerprint data may include means for triggering provision of the batch of fingerprint data to the online positioning system based upon the collection of a predefined number of data points or at least a predefined quantity of data by the data collection device. Additionally or alternatively, the means for providing the online positioning system with a batch of fingerprint data may include means for triggering provision of the batch of fingerprint data to the online positioning system based upon a predefined time interval. In an example embodiment, the apparatus also includes means for determining motion of the data collection device. In this example embodiment, the means for providing the online positioning system with the batch of fingerprint data includes means for triggering provision of the batch of fingerprint data to the online positioning system in an instance in which the data collection device is determined to have become stationary after having been in motion.

The means for determining the location of the data collection device in conjunction with its collection of fingerprint data includes, in one embodiment, means for determining the location associated with an intermediate data point of the fingerprint data based at least in part upon the respective locations determined for one or more data points collected prior to collection of the intermediate data point and also upon the respective locations determined for one or more data point collected following collection of the intermediate data point. In an example embodiment, the means for determining the location of the data collection device includes means for determining the location of the data collection device in conjunction with its collection of fingerprint data based upon information provided by the global navigation satellite system or the online positioning system in combination of information provided by one or more sensors associated with the data collection device. In this example embodiment, the apparatus may also include means for determining that at least one of the sensors is unreliable and means for reducing reliance upon the information provided by the at least one sensor that is determined to be unreliable in conjunction with determining the location of the data collection device.

The online positioning system of an example embodiment includes a positioning system that is remote from the data collection device, is accessible via the computer network and utilizes predefined positioning coverage information to identify the location of the data collection device. In an example embodiment, the means for determining the location of the data collection device in conjunction with its collection of fingerprint data includes means for determining or enabling determination of a reference position associated with the fingerprint data that is collected based upon information provided by the online positioning system. The apparatus of an example embodiment also includes means for determining the location of the data collection device in conjunction with its collection of fingerprint data based upon information provided by the online positioning system in an instance in which the global navigation satellite system is available for location determination.

In an example embodiment, a method is provided that includes determining whether a global navigation satellite system is available for location determination. In an instance in which the global navigation satellite system is unavailable for location determination, the method includes utilizing an online positioning system for location determination. In this regard, utilizing the online positioning system for location determination includes accessing, via a computer network, the online positioning system and providing the online positioning system with at least some fingerprint data collected by a data collection device. The method also utilizes the online positioning system for location determination by determining the location of the data collection device in conjunction with its collection of fingerprint data based upon information provided by the online positioning system.

The method of an example embodiment provides the online positioning system with at least some of the fingerprint data by providing the online positioning system with a batch of fingerprint data including fingerprint data associated with a plurality of data points. The method of this example embodiment also includes receiving information from the online positioning system relating to the location of the data collection device in conjunction with its collection of each of the plurality of data points. The method of an example embodiment determines the location of the data collection device in conjunction with its collection of fingerprint data by determining the location associated with an intermediate data point of the fingerprint data based at least in part upon on the respective locations determined for one or more data points collected prior to collecting the intermediate data point and also based upon the respective locations determined for one or more data points collected following collection of the intermediate data point. In an example embodiment and after having determined the location of the data collection device in conjunction with its collection of fingerprint data, the method also includes determining the location of the data collection device in conjunction with its subsequent collection of additional fingerprint data based upon information provided by one or more sensors associated with the data collection device.

In another example embodiment, an apparatus is provided that includes processing circuitry and at least one memory including computer program code instructions with the computer program code instructions configured to, when executed by the processing circuitry, cause the apparatus to determine whether a global navigation satellite system is available for location determination. In an instance in which the global navigation satellite system is unavailable for location determination, the computer program code instructions are configured to, when executed by the processing circuitry, cause the apparatus to utilize an online positioning system for location determination. In this regard, the computer program code instructions are configured to, when executed by the processing circuitry, cause the apparatus to utilize the online positioning system for location determination by accessing, via a computer network, the online positioning system and providing the online positioning system with at least some fingerprint data collected by a data collection device. The computer program code instructions are also configured to, when executed by the processing circuitry, cause the apparatus to utilize the online positioning system for location determination by determining the location of the data collection device in conjunction with its collection of fingerprint data based upon information provided by the online positioning system.

The computer program code instructions are configured to, when executed by the processing circuitry, cause the apparatus of an example embodiment to provide the online positioning system with at least some of the fingerprint data by providing the online positioning system with a batch of fingerprint data including fingerprint data associated with a plurality of data points. The computer program code instructions are also configured to, when executed by the processing circuitry, cause the apparatus of this example embodiment to receive information from the online positioning system relating to the location of the data collection device in conjunction with its collection of each of the plurality of data points. The computer program code instructions are configured to, when executed by the processing circuitry, cause the apparatus of an example embodiment to determine the location of the data collection device in conjunction with its collection of fingerprint data by determining the location associated with an intermediate data point of the fingerprint data based at least in part upon on the respective locations determined for one or more data points collected prior to collecting the intermediate data point and also based upon the respective locations determined for one or more data points collected following collection of the intermediate data point. In an example embodiment and after having determined the location of the data collection device in conjunction with its collection of fingerprint data, the computer program code instructions are also configured to, when executed by the processing circuitry, cause the apparatus to determine the location of the data collection device in conjunction with its subsequent collection of additional fingerprint data based upon information provided by one or more sensors associated with the data collection device.

In a further example embodiment, a computer program product is provided that includes at least one non-transitory computer-readable storage medium having computer-executable program code portions stored therein with the computer-executable program code portions including program code instructions configured to determine whether a global navigation satellite system is available for location determination. In an instance in which the global navigation satellite system is unavailable for location determination, the computer-executable program code portions include program code instructions configured to utilize an online positioning system for location determination. In this regard, the program code instructions configured to utilize the online positioning system for location determination include program code instructions configured to access, via a computer network, the online positioning system and program code instructions configured to provide the online positioning system with at least some fingerprint data collected by a data collection device. The program code instructions configured to utilize the online positioning system for location also include program code instructions configured to determine the location of the data collection device in conjunction with its collection of fingerprint data based upon information provided by the online positioning system.

The program code instructions of an example embodiment that are configured to provide the online positioning system with at least some of the fingerprint data include program code instructions configured to provide the online positioning system with a batch of fingerprint data including fingerprint data associated with a plurality of data points. The computer-executable program code portions of an example embodiment also include program code instructions configured to receive information from the online positioning system relating to the location of the data collection device in conjunction with its collection of each of the plurality of data points. The program code instructions of an example embodiment that are configured to determine the location of the data collection device in conjunction with its collection of fingerprint data include program code instructions configured to determine the location associated with an intermediate data point of the fingerprint data based at least in part upon on the respective locations determined for one or more data points collected prior to collecting the intermediate data point and also based upon the respective locations determined for one or more data points collected following collection of the intermediate data point. In an example embodiment and after having determined the location of the data collection device in conjunction with its collection of fingerprint data, the computer-executable program code portions also include program code instructions configured to determine the location of the data collection device in conjunction with its subsequent collection of additional fingerprint data based upon information provided by one or more sensors associated with the data collection device.

In yet another example embodiment, an apparatus is provided that includes means for determining whether a global navigation satellite system is available for location determination. In an instance in which the global navigation satellite system is unavailable for location determination, the apparatus includes means for utilizing an online positioning system for location determination. In this regard, the means for utilizing the online positioning system for location determination includes means for accessing, via a computer network, the online positioning system and means for providing the online positioning system with at least some fingerprint data collected by a data collection device. The means for utilizing the online positioning system for location determination also includes means for determining the location of the data collection device in conjunction with its collection of fingerprint data based upon information provided by the online positioning system.

The means for providing the online positioning system with at least some of the fingerprint data includes, in one embodiment, means for providing the online positioning system with a batch of fingerprint data including fingerprint data associated with a plurality of data points. The apparatus of this example embodiment also includes means for receiving information from the online positioning system relating to the location of the data collection device in conjunction with its collection of each of the plurality of data points. The means for determining the location of the data collection device in conjunction with its collection of fingerprint data includes, in one embodiment, means for determining the location associated with an intermediate data point of the fingerprint data based at least in part upon on the respective locations determined for one or more data points collected prior to collecting the intermediate data point and also based upon the respective locations determined for one or more data points collected following collection of the intermediate data point. In an example embodiment and after having determined the location of the data collection device in conjunction with its collection of fingerprint data, the apparatus also includes means for determining the location of the data collection device in conjunction with its subsequent collection of additional fingerprint data based upon information provided by one or more sensors associated with the data collection device.

BRIEF DESCRIPTION OF THE DRAWINGS

Figure 1:
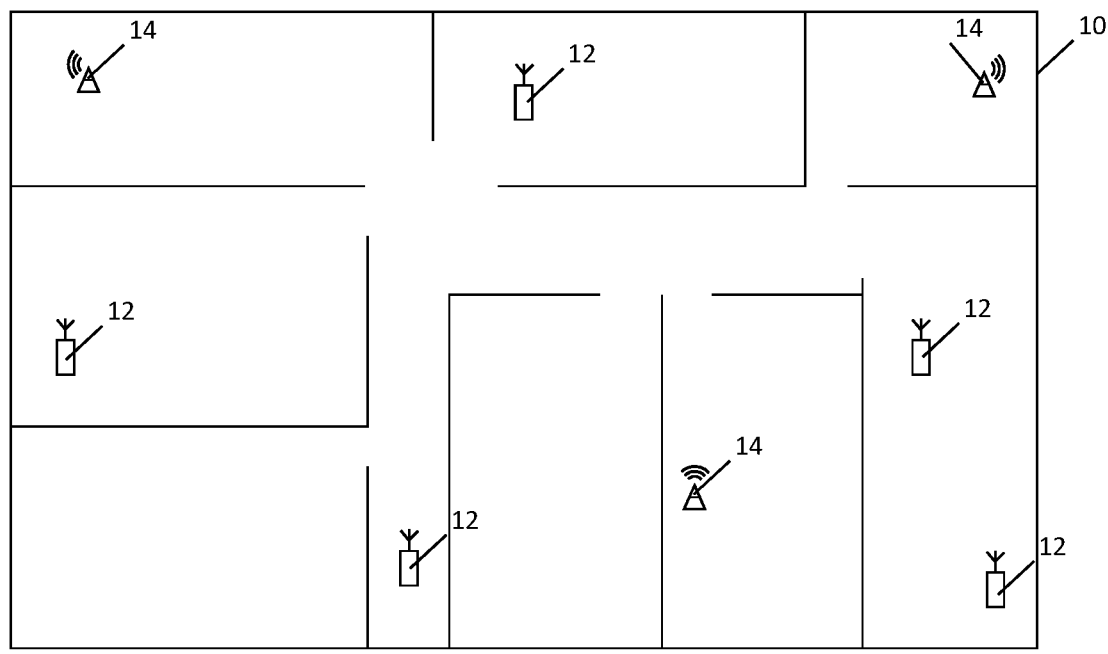
Figure 2:
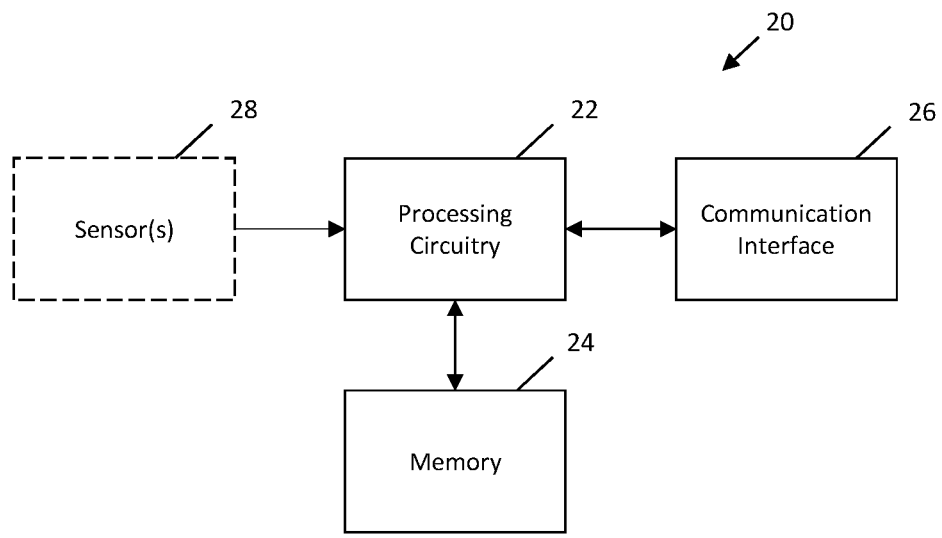
Figure 3:
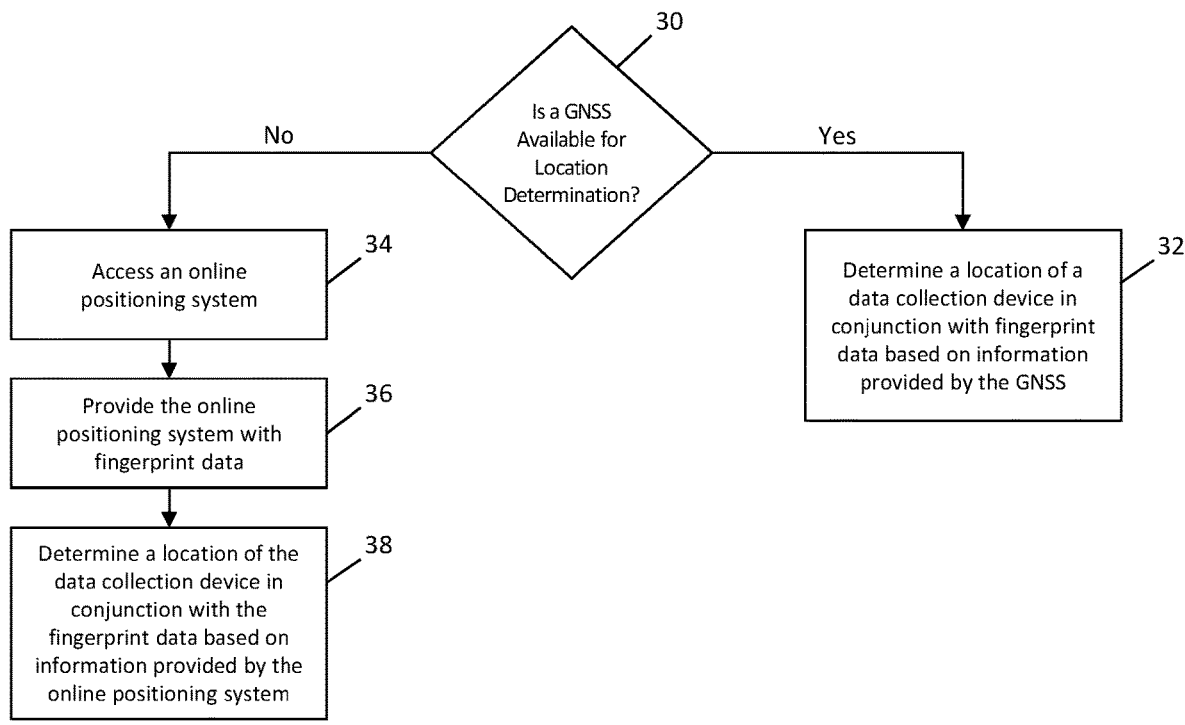
Figure 4:
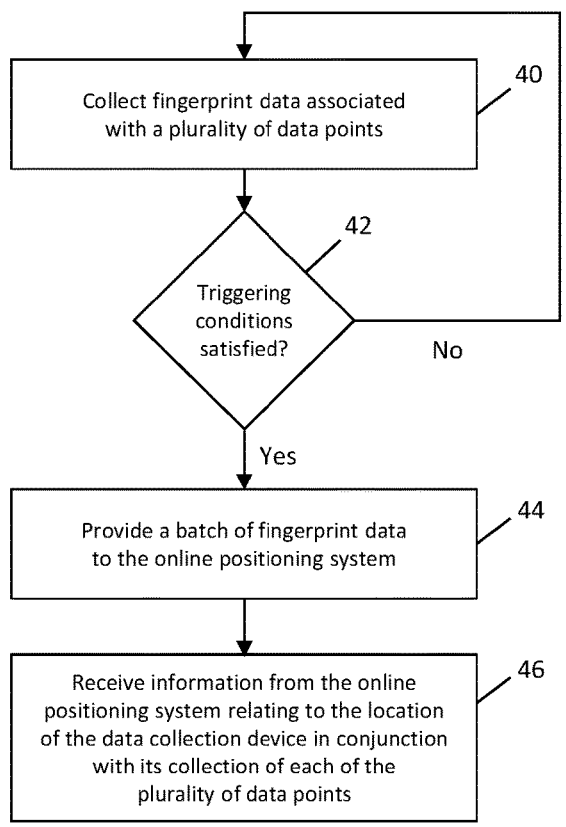

Having thus described example embodiments of the present disclosure in general terms, reference will now be made to the accompanying drawings, which are not necessarily drawn to scale, and wherein:

FIG. 1 is a schematic plan view of one floor of a building in which a plurality of data collection devices are positioned in order to provide for the crowd sourced collection of fingerprint data;

FIG. 2 is an apparatus that may be specifically configured in accordance with an example embodiment;

FIG. 3 is a flowchart illustrating operations performed, such as by the apparatus of FIG. 2, in accordance with an example embodiment; and FIG. 4 is a flowchart illustrating operations performed, such as by the apparatus of FIG. 2, in relation to the provision and processing of a batch of fingerprint data in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment in order to selectively utilize an online positioning system in order to determine a reference position associated with fingerprint data collected by a data collection device. Based upon the fingerprint data and the associated reference position, the fingerprint data may be utilized for constructing a radio map or otherwise providing information to be utilized in conjunction with positioning and navigation applications. In this regard, a plurality of data collection devices may collect and provide fingerprint data in order to support crowd sourcing of the fingerprint data that is necessary to construct a radio map or otherwise provide information to be utilized in conjunction with positioning and navigation applications.

By selectively utilizing an online positioning system, the reference position associated with fingerprint data may be determined even in instances in which a global navigation satellite system (GNSS) is unavailable. For example, the method, apparatus and computer program product may be configured to selectively utilize an online positioning system in an instance in which the data collection device is within a building or is otherwise located so as to be out of communication with the GNSS or in an instance in which the data collection device is not configured to communicate with the GNSS, such as in an instance in which the data collection device does not have GNSS functionality.

Data collection device may collect fingerprint data for a number of purposes including, as noted above, the construction of a radio map that provides a two-dimensional model of a radio environment from measurements observed by a data collection device and/or the provision of information that is utilized by positioning and navigation systems. Data collection devices may be embodied in a variety of different manners, such as a mobile device which may include any of a wide variety of mobile terminals such as a mobile telephone, a smart phone, a personal digital assistant (PDA), a personal navigation device, a smart watch, a tablet computer, or any combination of the aforementioned and other types of portable computer devices.

Regardless of the manner in which the data collection device is embodied, the data collection device is configured to capture fingerprint data from each of one or more data points. For a respective data point, the fingerprint data defines the parameters and characteristics of signals, such as non-cellular signals, radio signals, etc., captured by a data collection device at a respective location. The fingerprint data also identifies the source of the signals, such as an access point. A variety of sources may transmit the signals captured by a data collection device. For example, the source may be a Wi-Fi access point, a wireless local area network (WLAN) access point, a positioning beacon, etc. The fingerprint data may identify the source of the signals in various manners depending upon the type of source that transmitted the signals that were captured by the data collection device. In an example embodiment in which the access point is a Wi-Fi access point, the fingerprint data may include information identifying the access point in terms of the BSSID of the access point. Alternatively, in an instance in which the access point is a WLAN access point, the fingerprint data may include the media access control (MAC) address of the air interface of the WLAN access point. In other embodiments, the fingerprint data may include the service set identifier (SSID) or the network name of the access point, e.g., WLAN access point. In addition to the identity of the access point, the fingerprint data can include one or more parameters or characteristics of the received signals, such as the signal strength, e.g., the received signal strength, the Rx level, etc., the path loss estimate, a timing measurement, e.g., the round trip time measurement, the frequency band or the like.

One example in which a plurality of data collection devices are utilized to collect fingerprint data in a crowd sourced manner in order to generate a radio map or to otherwise provide information for positioning or navigation applications is depicted in FIG. 1. In this regard, within the building 10 of FIG. 1, a plurality of data collection devices 12, such as smart phones, move therethrough. At each of a plurality of data points, each data collection device receives radio signals from an access point 14 and determines fingerprint data relating to the radio signals that were received. A reference position is to be associated with the fingerprint data collected at each data point to identify the location of the data collection device when the radio signals were received. Although GNSS may be utilized to determine the location of the data collection device in some situations, GNSS may be unavailable or may otherwise be inaccessible in other situations. In those situations in which GNSS is unavailable or is otherwise inaccessible for purposes of determining the location of a data collection device, the method, apparatus and computer program product of an example embodiment selectively utilize an online positioning system to determine the location of a data collection device upon collection of the fingerprint data for a respective data point. Based upon the fingerprint data collected by the data collection devices and the locations of the data collection devices at the time at which the radio signals were captured, a radio map of the building may be constructed or information regarding the radio signals that anticipated to be captured at different locations within the building may be defined and thereafter utilized for purposes of positioning or navigation within the building.

The method, apparatus and computer program product are therefore provided in conjunction with an example embodiment in order to selectively utilize an online positioning system in order to determine the location, that is, the reference position, associated with fingerprint data collected by a data collection device 12. The apparatus may be embodied by any of a variety of computing devices including, for example, one or more of the data collection devices or a positioning system, a server, a cloud computing device, a computer workstation, a distributed network of computing devices, a personal computer or any other type of computing device. In an embodiment in which the apparatus is embodied by a computing device that is separate from the data collection device(s), a computing device that embodies the apparatus is configured to receive the fingerprint data collected by the data collection devices. As such, the computing device that embodies the apparatus may be in communication, either directly or indirectly, with the data collection devices or the computing device that embodies the apparatus may be in communication, either directly or indirectly, with a memory device or a database that stores fingerprint data collected by the data collection devices.

Although the apparatus may be embodied in different manners, the apparatus 20 of an example embodiment that is configured to selectively utilize an online positioning system to determine the reference position associated with fingerprint data collected by a data collection device 12 is depicted in FIG. 2. In this example embodiment, the apparatus includes, is associated with or is otherwise in communication with processing circuitry 22, a memory 24 and optionally a communication interface 26. As shown in FIG. 2 and as described below, the apparatus may also optionally include or otherwise be in communication one or more sensors 28, such as one or more accelerometers, gyroscopes, motion sensors, inertial sensors, magnetometers, barometers, etc. that are configured to sense motion of a data collection device.

In some embodiments, the processing circuitry 22 (and/or co-processors or any other processors assisting or otherwise associated with the processing circuitry) can be in communication with the memory 24 via a bus for passing information among components of the apparatus 20. The memory can be non-transitory and can include, for example, one or more volatile and/or non-volatile memories. In other words, for example, the memory may be an electronic storage device (for example, a computer readable storage medium) comprising gates configured to store data (for example, bits) that can be retrievable by a machine (for example, a computing device like the processing circuitry). The memory can be configured to store information, data, content, applications, instructions, or the like for enabling the apparatus to carry out various functions in accordance with an example embodiment of the present disclosure. For example, the memory can be configured to buffer input data for processing by the processing circuitry. Additionally or alternatively, the memory can be configured to store instructions for execution by the processing circuitry.

The processing circuitry 22 can be embodied in a number of different ways. For example, the processing circuitry may be embodied as one or more of various hardware processing means such as a processor, a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry can include one or more processing cores configured to perform independently. A multi-core processor can enable multiprocessing within a single physical package. Additionally or alternatively, the processing circuitry can include one or more processors configured in tandem via the bus to enable independent execution of instructions, pipelining and/or multithreading.

In an example embodiment, the processing circuitry 22 can be configured to execute instructions stored in the memory 24 or otherwise accessible to the processing circuitry. Alternatively or additionally, the processing circuitry can be configured to execute hard coded functionality. As such, whether configured by hardware or software methods, or by a combination thereof, the processing circuitry can represent an entity (for example, physically embodied in circuitry) capable of performing operations according to an embodiment of the present disclosure while configured accordingly. Thus, for example, when the processing circuitry is embodied as an ASIC, FPGA or the like, the processing circuitry can be specifically configured hardware for conducting the operations described herein. Alternatively, as another example, when the processing circuitry is embodied as an executor of software instructions, the instructions can specifically configure the processing circuitry to perform the algorithms and/or operations described herein when the instructions are executed. However, in some cases, the processing circuitry can be a processor of a specific device (for example, a computing device, a data collection device 12, etc.) configured to employ an embodiment of the present disclosure by further configuration of the processor by instructions for performing the algorithms and/or operations described herein. The processing circuitry can include, among other things, a clock, an arithmetic logic unit (ALU) and/or one or more logic gates configured to support operation of the processing circuitry.

The apparatus 20 of an example embodiment also includes the communication interface 26, such as in instances in which the apparatus is separate from, but in communication with the data collection devices 12. The communication interface can be any means such as a device or circuitry embodied in either hardware or a combination of hardware and software that is configured to receive and/or transmit data from/to other electronic devices in communication with the apparatus, such as the data collection devices and/or a memory device or database that stores fingerprint data collected by the data collection devices. Additionally or alternatively, the communication interface can be configured to communicate in accordance with various wireless protocols including Global System for Mobile Communications (GSM), such as but not limited to Long Term Evolution (LTE). In this regard, the communication interface can include, for example, an antenna (or multiple antennas) and supporting hardware and/or software for enabling communications with a wireless communication network. In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication.

As depicted in FIG. 3, the operations performed, such as by the apparatus 20 of FIG. 2, in accordance with an example embodiment are depicted. Following collection of fingerprint data for one or more data points by a data collection device 12, the apparatus includes means, such as the processing circuitry 22, the communication interface 26 or the like, for determining whether the GNSS is available in order to determine the location, that is, the reference position, associated with the fingerprint data collected by the data collection device. See block 30. In this regard, the reference position is the location of the data collection device at the time that the fingerprint data for a respective data point is captured.

The apparatus 20, such as the processing circuitry 22, the communication interface 26 or the like, may be configured to determine whether the GNSS is available in response to a request by a data collection device 12 for a reference location associated with fingerprint data that has been collected by the data collection device for a respective data point. Alternatively, the apparatus, such as the processing circuitry, the communication interface or the like, may be configured to determine whether the GNSS is available for purposes of determining the location of the data collection device when fingerprint data that has been collected by the data collection device on a periodic basis or in accordance with another predefined schedule, independent of the collection of the fingerprint data and/or a request by a data collection device for its location.

In an instance in which the GNSS is available for purposes of determining the location associated with fingerprint data collected by a data collection device 12 at a respective data point, the apparatus 20 includes means, such as the processing circuitry 22, the communication interface 26 or the like, for providing fingerprint data to the GNSS and for receiving information regarding the location associated with the fingerprint data from the GNSS. As shown in block 32 of FIG. 3, the apparatus of an example embodiment therefore also includes means, such as the processing circuitry, the communication interface or the like, for determining the location of the data collection device in conjunction with fingerprint data of a respective data point based upon the information provided by the GNSS. In this regard, the location of the data collection device is a reference location that may be provided by the GNSS and then included within or in association with the fingerprint data. Thus, in an instance in which the GNSS is available, such as in an instance in which the data collection device is outdoors or in an instance in which the data collection device is indoors, but is still able to communicate with the GNSS, such as in an instance in which the data collection device is inside a building but is located about its periphery, the apparatus may rely upon the GNSS to provide information from which the reference location associated with fingerprint data may be determined.

However, in an instance in which the GNSS is unavailable for purposes of determining the reference location associated with fingerprint data for a respective data point, such as in an instance in which the data collection device 12 is within in a building or in which the data collection device is not configured to communicate with the GNSS, the apparatus 20 is configured to utilize on online positioning system, instead of the GNSS, to determine the location of the data collection device in conjunction with the fingerprint data that has been collected. Any of a variety of online positioning systems may be utilized, but the online positioning system is generally remote from the data collection devices, accessible via a computer network and configured to determine the location of a data collection device in conjunction with the collection of fingerprint data based upon signals captured by the data collection device from a respective access point 14 in reference to predefined positioning coverage information, such as pre-calculated positioning data or models. In this regard, the online positioning system may be embodied by any network positioning system in which a client, such as a data collection device, collects network measurements and sends the measurements to the network, such as a cloud service, and receives in response a position estimate of the client. For example, the online positioning system may be a Wi-Fi positioning system, a Bluetooth (BT) positioning system, a cellular positioning system or other network positioning system with which the apparatus is in communication. In addition to the use of the online positioning system in an instance in which the GNSS is not available, the online positioning system may also be configured to determine the location of the data collection device in conjunction with its collection of fingerprint data based upon information provided by the online positioning system in an instance in which the global navigation satellite system is available for location determination, thereby providing for the concurrent determination of the location of the data collection device along with the GNSS.

As shown in block 34, the apparatus 20 also include means, such as the processing circuitry 22, the communication interface 26 or the like, for accessing, via a computer network, the online positioning system. The online positioning system may be accessed and communication with the online positioning system may be supported by any of a variety of different types of computer networks including, for example, a cellular communications network, a wide area network (WAN), the Internet or any other wired or wireless network via which a plurality of computers communicate. As shown in block 36, the apparatus also includes means, such as the processing circuitry, the communication interface or the like, for providing the online positioning system with the fingerprint data. Based on the fingerprint data, the online positioning system is configured to determine the location of the data collection device at the time that the data collection device captured the radio signals represented by the fingerprint data. The apparatus of this example embodiment also includes means, such as the processing circuitry, the communication interface or the like, for receiving information provided by the online positioning system regarding the location of the data collection device in conjunction with the fingerprint data. The apparatus additionally includes means, such as the processing circuitry, the communication interface or the like, for determining the location of the data collection device in conjunction with the fingerprint data, such as the reference location of the data collection device when the signals were captured, based on information provided by the online positioning system. See block 38 of FIG. 3. As such, even in an instance in which the GNSS is unavailable or inaccessible, the location of the data collection device when capturing the signals represented by the fingerprint data may be determined based upon information provided by the online positioning system.

The apparatus 20, such as a processing circuitry 22, may be configured to access the online positioning system and to determine the location of the data collection device 12 in conjunction with the fingerprint data for a single data point based upon information provided by the online positioning system. Thus, the apparatus may be configured to determine the reference location associated with the fingerprint data on a data point by data point basis. Alternatively, the apparatus may be configured to concurrently determine the locations associated with the fingerprint data for a plurality of data points in a batch process. In this regard, the fingerprint data for a plurality of data points may be provided to the online positioning system in a batch and the information regarding the locations of the data collection device in conjunction with the fingerprint data for the plurality of data points may also be returned to the apparatus in a batch as depicted, for example, in FIG. 4. Utilizing a batch process is particularly useful in conjunction with embodiments that do not demand a real time determination of the location of a data point, such as in conjunction with the crowd sourced development of a radio map in comparison to the more real time demands of a positioning system.

A number of technical advantages are provided in conjunction with the determination of the locations of the data collection device in conjunction with the fingerprint data for a plurality of data points in a batch. These technical advantages include, but are not limited to, a reduction in the number of times that communication must be established between the apparatus 20 and the online positioning system as well as a corresponding reduction in the quantity of data that is transferred to and from the online positioning system. As such, the batch process conserves bandwidth and reduces power consumption, both for the apparatus and the online positioning system. The utilization of a batch process may also advantageously reduce the number of radio model database queries made by the online positioning system.

In an embodiment in which a batch of fingerprint data for a plurality of data points is provided to the online positioning system, the data collection devices 12 are configured to collect fingerprint data associated with a plurality of data points as shown in block 40 of FIG. 4. In some instances, at least some of the fingerprint data is associated with data points having different locations.

The apparatus 20 of this example embodiment includes means, such as the processing circuitry 22 or the like, for determining whether one or more triggering conditions are satisfied and includes means, such as the processing circuitry, the communication interface 26 or the like, for providing for transmission of the fingerprint data for one or more data points to the online positioning system if a triggering condition is satisfied. See blocks 42 and 44 of FIG. 4. As described below, a variety of different triggering conditions may be defined. In an instance in which the triggering conditions are not satisfied, the data collection device 12 may continue to collect fingerprint data associated with one or more additional data points until such time that a triggering condition is satisfied. However, in an instance in which one or more triggering conditions are satisfied, the apparatus of an example embodiment includes means, such as the processing circuitry, the communication interface or the like, for providing a batch of fingerprint data associated with a plurality of data points to the online positioning system.

The online positioning system may then be configured to determine the location of the data collection device 12 in conjunction with the fingerprint data for each of the plurality of data points and to provide information regarding the locations to the apparatus 20. The apparatus therefore also includes means, such as the processing circuitry 22, the communication interface or the like, for receiving the information regarding the locations of the data collection device in conjunction with the fingerprint data for the plurality of data points of the batch. See block 46 of FIG. 4. In some embodiments, the information received from the online positioning system may be stored by the memory 24 for subsequent access by the processing circuitry. The apparatus also includes means, such as the processing circuitry or the like, for determining the locations of the data collection device in conjunction with the fingerprint data that is associated with each of the plurality of data points included within the batch of fingerprint data.

For example, in an instance in which a batch of fingerprint data includes fingerprint data for ten data points designated P1, P2, ... P10, the apparatus 20, such as the processing circuitry 22, is configured to determine the location of the data collection device 12 upon receiving the radio signals at each of the ten data points. Thus, the apparatus, such as the processing circuitry, is configured to identify ten locations L1, L2, ... L10 of the data collection device upon collection of the data points P1, P2, ... P10, respectively.

As noted above, a variety of triggering conditions may be defined with respect to the provision of the batch of fingerprint data to the online positioning system. In one example, a triggering condition may be the connection of the data connection device 12 to one or more predefined types of access networks, such as a Wi-Fi network, a WLAN or the like. By awaiting connection of the data collection device to an access network from among the one or more predefined types of access networks, the fingerprint data may be transferred efficiently and securely and, in some instances, without any or with less costs associated with the data transmission. Similarly, the triggering condition may be the connection of the data collection device with an external power supply, thereby ensuring that the data collection device has sufficient power to transmit the fingerprint data to the online positioning system without draining the battery.

In another example embodiment, the triggering condition may be the collection of at least a predefined number of data points or at least a predefined quantity of data, such as predefined number of bytes, by the data collection device 12. By requiring at least a predefined number of data points or at least a predefined quantity of data to be collected prior to transmitting the fingerprint data to the online positioning system, the size of the batch of fingerprint data may be controlled to avoid the transmission of small batches of fingerprint data, thereby correspondingly increasing the efficiency with which communications with the online positioning system are conducted. In yet another example embodiment, the triggering condition is based upon a predefined time interval. For example, this triggering condition may require that the data collection device wait at least the predefined time interval between the transmission of batches of fingerprint data. Additionally or alternatively, the predefined time interval may require that the data collection device collect fingerprint data for at least the predefined time interval prior to transmitting the batch of fingerprint data to the online positioning system, thereby also increasing the likelihood that communications with the online positioning system are conducted efficiently with the transmission of batches of fingerprint data for a plurality of data points to the online positioning system.

In yet another example embodiment, the triggering condition may be that the data collection device 12 is determined to have become stationary after having been in motion. In this example embodiment, the data collection device may also include one or more sensors 18, such as an accelerometer, a gyroscope, a motion senor, a speed sensor, an inertial sensor, a magnetometer, a barometer, or the like, from which the processing circuitry 22 can determine whether the data collection device is in motion or is stationary. As noted above and as shown in FIG. 2, the apparatus 20 may include the one or more sensors, such as in an instance in which the apparatus is embodied by the data collection device, or the apparatus may be associated with or in communication with the one or more sensors, such as in an instance in which the apparatus is separate from, but in communication with the data collection device. In an instance in which the data collection device is determined to have become stationary after having been in motion, the apparatus, such as the processing circuitry, may be configured to determine that the triggering condition is satisfied and cause the batch of fingerprint data to be provided to the online positioning system, such as via the communication interface 26. In at least some embodiments, the data collection device is configured so as not to collect fingerprint data in an instance in which the data collection device is stationary so as to conserve power and increase the overall efficiency since the collection of multiple instances of fingerprint data while the data collection device is stationary would likely not be informative as to the resulting radio map. In this regard, the multiple instances of fingerprint data that would otherwise be collected while the data collection device is stationary would likely be identical.

As described above, the reference location for the fingerprint data collected by the data collection device at a respective data point may be determined for each of a plurality of data points over the course of time, be in a batch process or in an individualized manner. By determining the locations associated with the fingerprint data for multiple data points collected over the course of time, the location of one or more intermediate data points may be determined by the apparatus 20, such as the processing circuitry 22, based upon the locations of the data points both prior to and following an intermediate data point. In this regard, the fingerprint data for an intermediate data point is collected after the fingerprint data was collected for one or more prior data points, but prior to collection of fingerprint data for one or more subsequent data points. The locations of the prior and subsequent data points may have already been determined based upon information provided by the online positioning system. By determining the location of the intermediate data point based upon the locations of both the prior and subsequent data points, the apparatus, such as the processing circuitry, may determine the location of the intermediate data point with increased accuracy.

In this example embodiment, the apparatus 20, such as the processing circuitry 22, of an example embodiment is configured to determine the location associated with an intermediate data point of the fingerprint data based at least in part upon the respective locations determined for one or more data points collected prior to collection the intermediate data point and also based upon the respective locations determined for one or more data points collected following collection of the intermediate data point. Thus, while the reference location for each data point at which the data collection device 12 captures fingerprint data may be determined by reference to the GNSS or the online positioning system, the apparatus, such as the processing circuitry, of another example embodiment utilizes GNSS or the online positioning system to determine the location for some of the data points at which fingerprint data was collected by the data collection device and then determines the location of one or more intermediate data points based upon the locations of the prior and subsequent data points, such as based upon an extrapolation between the locations associated with the prior and subsequent data points that are based upon information provided by the GNSS or the online positioning system. The locations of the prior and subsequent data points may be combined in various manners in other embodiments in order to determine the location of one or more intermediate data points, such as by using, for example, Bayesian smoothing methods, such as Rauch-Tung-Striebel smoothers and their extensions or particle smoothers. As such, the locations of the data points at which the data collection device collects fingerprint data may be determined in an accurate manner, while efficiently utilizing the GNSS or the online positioning system to provide information regarding the locations of some, but not all data points.

As noted above, the data collection device 12 may include or otherwise be associated with one or more sensors 18, such as sensors configured to determine movement of the data collection device, e.g., one or more accelerometers, gyroscopes, motion sensors, speed sensors, inertial sensors, magnetometers, barometers, etc. As such, the apparatus 20 of an example embodiment includes means, such as the processing circuitry 22 or the like, for determining the location the data collection device in conjunction with its collection of fingerprint data based upon information provided by the GNSS or the online positioning system in combination with the information provided by one or more sensors associated with the data collection device.

In this regard, the location associated with one or more first data points at which the data collection device 12 captures fingerprint data may be determined based upon information provided by the GNSS or the online positioning system. In this example embodiment, the apparatus 20, such as the processing circuitry 22, is configured to determine the location associated with one or more second data points at which the data collection device subsequently collects fingerprint data based upon the location of the one or more first data points as determined based upon information provided by the GNSS or the online positioning system and further based upon information provided by the one or more sensors 18 of the data collection device. In some example embodiments, the output of one or more sensors of the data collection device is provided to a Kalman filter, a particle filter or the like in order to determine the change in position of a second data point relative to a prior known position, such as the location of the one or more first data points as determined based upon the information from the GNSS or the online positioning system. Thus, while every data point may be located based upon information provided by the GNSS or the online positioning system, the apparatus, such as the processing circuitry, of another example embodiment utilizes GNSS or the online positioning system to determine the location for the one or more first data points at which fingerprint data was collected by the data collection device and then determines the location of one or more subsequent data points based upon the locations of the one or more first data points in combination with the subsequent change in position indicated by the output of the one or more sensors. As such, the locations of the data points at which the data collection device collects fingerprint data may be determined in an accurate manner, while efficiently utilizing the GNSS or the online positioning system to provide information regarding the locations of some, but not all data points.

In this example embodiment, the apparatus 20, such as the processing circuitry 22, may also be configured to determine an instance in which a sensor 18 is unreliable, such as an instance in which the sensor is malfunctioning. For example, the apparatus, such as the processing circuitry, of this example embodiment may be configured to determine the location of a data point of which the data collection device 12 captured fingerprint data both by reference to information provided by the GNSS or the online positioning system as well as by reference to information provided by the one or more sensors that is indicative of a change in position relative to the location of a prior data point as provided by information from the GNSS or the online positioning system. In this example embodiment, the apparatus, such as the processing circuitry, is configured to compare these two locations of the same data point. In an instance in which the locations are the same or within a predefined difference, such as within a predefined percentage or tolerance of one another, the apparatus, such as the processing circuitry, is configured to determine that the one or more sensors are operating in a reliable manner, thereby increasing the confidence in the location of data points determined based upon a change in position indicated by one or more sensors. However, in an instance in which the locations determined by the two different techniques are different from one another, such as different by more than a predefined percentage or tolerance, the apparatus, such as the processing circuitry, of an example embodiment is configured to determine that at least one of the sensors is unreliable.

In this instance, the apparatus 20, such as the processing circuitry 22, is also configured to reduce its reliance upon information provided by at least one sensor 18 that is determined to be unreliable in conjunction with determining of the data collection device 12. For example, until such time that at least one sensor is repaired, replaced or otherwise determined to again behaving in a reliable manner, the apparatus, such as the processing circuitry, may be configured to determine the location of a data point at which the data collection device captures fingerprint data based only upon information provided by the GNSS or the online positioning system without reliance upon the one or more sensors of the data collection device. As such, the apparatus can maintain the confidence in the locations of the data points at which the data collection device captures fingerprint data.

Based upon the fingerprint data including the reference position that is determined for each of the data points, a radio map may be constructed by the method, apparatus 20 and computer program product of an example embodiment in an accurate and efficient manner, even in instances in which the GNSS is unavailable. A radio map serves as a radio model of the access points that defines the signal characteristics of radio signals that are transmitted by the access points and received by mobile devices at different respective locations. The radio map may then be utilized for positioning purposes, that is, to determine the location of a mobile device based upon radio signals received by the mobile device at the respective location. For example, while a mobile device is at an unknown location, the mobile device may capture measurements of radio signals transmitted by the access points. By reference to the radio map that has been constructed, the measurements of the radio signals may be evaluated and the location of the mobile device may be determined, such as based upon the coverage areas of the access points. Various radio maps may be constructed including radio maps based upon the coverage areas of the access points, radio maps based upon the positions of the access points, radio propagation models, radio maps based upon the Rx fields of the access points or the like.

As described above, FIGS. 3 and 4 are flowcharts of an apparatus 20, method, and computer program product configured to selective utilize an online positioning network to identify the location associated with fingerprint data collected by a data collection device 12 according to an example embodiment. It will be understood that each block of the flowcharts, and combinations of blocks in the flowcharts, may be implemented by various means, such as hardware, firmware, processing circuitry 22, and/or other devices associated with execution of software including one or more computer program instructions. For example, one or more of the procedures described above may be embodied by computer program instructions. In this regard, the computer program instructions which embody the procedures described above may be stored by the memory 24 of the apparatus and executed by the processing circuitry or the like. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
in an instance in which a global navigation satellite system is available for location determination, determining a location of a data collection device in conjunction with its collection of fingerprint data based upon information provided by the global navigation satellite system;
in an instance in which the global navigation satellite system is unavailable for location determination, (i) providing, via a computer network, an online positioning system with at least some fingerprint data collected by the data collection device, and (ii) determining the location of the data collection device in conjunction with its collection of fingerprint data based upon information provided by the online positioning system; and
following determination of the location of the data collection device in conjunction with its collection of fingerprint data based upon information provided by the online positioning system, constructing a radio map based upon the fingerprint data that has been collected and the location of the data collection device in conjunction with its collection of fingerprint data including the location of the data collection device that is determined based upon information provided by the online positioning system in an instance in which the global navigation satellite system is unavailable.

2. A method according to claim 1, wherein providing the online positioning system with at least some of the fingerprint data comprises providing the online positioning system with a batch of fingerprint data comprising fingerprint data associated with a plurality of data points, and wherein the method further comprises receiving information from the online positioning system relating to the location of the data collection device in conjunction with its collection of each of the plurality of data points.

3. A method according to claim 2, wherein providing the online positioning system with the batch of fingerprint data comprises triggering provision of the batch of fingerprint data to the online positioning system based upon at least one of an establishment by the data collection device of a connection with one or more predefined types of access networks.

4. A method according to claim 2, wherein providing the online positioning system with the batch of fingerprint data comprises triggering provision of the batch of fingerprint data to the online positioning system based upon collection of at least a predefined number of data points or at least a predefined quantity of data by the data collection device.

5. A method according to claim 2, wherein providing the online positioning system with the batch of fingerprint data comprises triggering provision of the batch of fingerprint data to the online positioning system based upon a predefined time interval.

6. A method according to claim 2, further comprising determining motion of the data collection device, wherein providing the online positioning system with the batch of fingerprint data comprises triggering provision of the batch of fingerprint data to the online positioning system in an instance in which the data collection device is determined to have become stationary after having been in motion.

7. A method according to claim 1, further comprising determining the location of the data collection device in conjunction with its collection of fingerprint data based upon information provided by the online positioning system in an instance in which the global navigation satellite system is available for location determination.

8. A method according to claim 1, wherein determining the location of the data collection device in conjunction with its collection of fingerprint data comprises determining the location associated with an intermediate data point of the fingerprint data based at least in part upon the respective locations determined for one or more data points collected prior to collection of the intermediate data point and also upon the respective locations determined for one or more data points collected following collection of the intermediate data point.

9. A method according to claim 1, wherein determining the location of the data collection device comprises determining the location of the data collection device in conjunction with its collection of fingerprint data based upon information provided by the global navigation satellite system or the online positioning system in combination with information provided by one or more sensors associated with the data collection device.

10. A method according to claim 9, further comprising:
determining that at least one of the sensors is unreliable; and
reducing reliance upon the information provided by the at least one sensor that is determined to be unreliable in conjunction with determining the location of the data collection device.

11. A method according to claim 1, wherein the online positioning system comprises a positioning system that is remote from the data collection device, is accessible via the computer network and utilizes predefined positioning coverage information to identify the location of the data collection device.

12. A method according to claim 1, wherein determining the location of the data collection device in conjunction with its collection of fingerprint data comprises determining or enabling determination of a reference position associated with the fingerprint data that is collected based upon information provided by the online positioning system.

13. An apparatus comprising processing circuitry and at least one memory including computer program code instructions, the computer program code instructions configured to, when executed by the processing circuitry, cause the apparatus to:
in an instance in which a global navigation satellite system is available for location determination, determine a location of a data collection device in conjunction with its collection of fingerprint data based upon information provided by the global navigation satellite system;
in an instance in which the global navigation satellite system is unavailable for location determination, (i) provide, via a computer network, an online positioning system with at least some fingerprint data collected by the data collection device, and (ii) determine the location of the data collection device in conjunction with its collection of fingerprint data based upon information provided by the online positioning system; and
following determination of the location of the data collection device in conjunction with its collection of fingerprint data based upon information provided by the online positioning system, construct a radio map based upon the fingerprint data that has been collected and the location of the data collection device in conjunction with its collection of fingerprint data including the location of the data collection device that is determined based upon information provided by the online positioning system in an instance in which the global navigation satellite system is unavailable.

14. An apparatus according to claim 13, wherein the computer program code instructions are configured to, when executed by the processing circuitry, cause the apparatus to provide the online positioning system with at least some of the fingerprint data by providing the online positioning system with a batch of fingerprint data comprising fingerprint data associated with a plurality of data points, and wherein the computer program code instructions are further configured to, when executed by the processing circuitry, cause the apparatus to receive information from the online positioning system relating to the location of the data collection device in conjunction with its collection of each of the plurality of data points.

15. An apparatus according to claim 14, wherein the computer program code instructions are configured to, when executed by the processing circuitry, cause the apparatus to provide the online positioning system with the batch of fingerprint data by triggering provision of the batch of fingerprint data to the online positioning system based upon at least one of an establishment by the data collection device of a connection with one or more predefined types of access networks.

16. An apparatus according to claim 14, wherein the computer program code instructions are configured to, when executed by the processing circuitry, cause the apparatus to provide the online positioning system with the batch of fingerprint data by triggering provision of the batch of fingerprint data to the online positioning system based upon collection of at least a predefined number of data points or at least a predefined quantity of data by the data collection device.

17. An apparatus according to claim 14, wherein the computer program code instructions are further configured to, when executed by the processing circuitry, cause the apparatus to determine motion of the data collection device, wherein the computer program code instructions are configured to, when executed by the processing circuitry, cause the apparatus to provide the online positioning system with the batch of fingerprint data by triggering provision of the batch of fingerprint data to the online positioning system in an instance in which the data collection device is determined to have become stationary after having been in motion.

18. A method comprising:
in an instance in which a global navigation satellite system is unavailable for location determination, utilizing an online positioning system for location determination by:
accessing, via a computer network, the online positioning system;
providing the online positioning system with at least some fingerprint data collected by a data collection device, wherein providing the online positioning system with at least some of the fingerprint data comprises providing the online positioning system with a batch of fingerprint data comprising fingerprint data associated with a plurality of data points;
receiving information from the online positioning system relating to the location of the data collection device in conjunction with its collection of each of the plurality of data points; and
determining a location of the data collection device in conjunction with its collection of fingerprint data based upon information provided by the online positioning system.

19. A method according to claim 18, further comprising, after having determined the location of the data collection device in conjunction with its collection of fingerprint data, determining the location of the data collection device in conjunction with its subsequent collection of additional fingerprint data based upon information provided by one or more sensors associated with the data collection device.

* * * * *